(12) United States Patent
Saijo

(10) Patent No.: US 8,285,054 B2
(45) Date of Patent: *Oct. 9, 2012

(54) INFORMATION PROCESSING APPARATUS AND INFORMATION PROCESSING METHOD

(75) Inventor: Nobuhiro Saijo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,047

(22) Filed: Apr. 18, 2011

(65) Prior Publication Data

US 2011/0194774 A1   Aug. 11, 2011

Related U.S. Application Data

(62) Division of application No. 13/058,948, filed as application No. PCT/JP2010/003427 on May 21, 2010.

(30) Foreign Application Priority Data

Jun. 30, 2009 (JP) ................................ 2009-154921

(51) Int. Cl.
    G06K 9/46      (2006.01)
    G06K 9/00      (2006.01)
(52) U.S. Cl. ..................................................... 382/190
(58) Field of Classification Search .................. 382/103, 382/118, 181, 190, 203, 209, 218
    See application file for complete search history.

(56) References Cited

U.S. PATENT DOCUMENTS

2008/0177185 A1 * 7/2008 Nakao et al. .................. 600/476

FOREIGN PATENT DOCUMENTS

| JP | 10 150572 | 6/1998 |
|----|-----------|--------|
| JP | 2003 216955 | 7/2003 |
| JP | 2003 248829 | 9/2003 |
| JP | 2005 250708 | 9/2005 |
| JP | 2006 242909 | 9/2006 |

OTHER PUBLICATIONS

U.S. Appl. No. 13/059,422, filed May 18, 2011, Saijo.
Office Action issued Mar. 9, 2010 in Japanese Patent Application No. 2009-154921 filed Jun. 30, 2009.
International Search Report issued Sep. 13, 2010 in PCT/JP10/03427 filed May 21, 2010.

(Continued)

Primary Examiner — Amir Alavi
(74) Attorney, Agent, or Firm — Oblon, Spivak, McClelland, Maier & Neustadt, L.L.P.

(57) ABSTRACT

Methods and apparatuses for detecting a plurality of pixels of interest within an image and identifying luminance values corresponding to a predetermined object. The apparatus for detecting includes a memory configured to store first and second images captured using light of first and second wavelengths, respectively. The apparatus for detecting further includes at least one processor configured to detect a plurality of pixels of interest within the first captured image based on luminance values of the stored first and second captured images. The apparatus for identifying includes a memory configured to store a processed image, and at least one processor configured to determine frequencies of luminance values of the plurality of pixels of interest in the processed image and to determine a range of luminance values corresponding to a predetermined object within the processed image based on the determined frequencies of the luminance values.

10 Claims, 15 Drawing Sheets

OTHER PUBLICATIONS

Suzuki, Yasuhiro et al., "Skin Detection by Near Infrared Multi-band for Driver Support System", LNCS 3852, pp. 722-731, XP002596068, (2006).

Pavlidis, Loannis et al., "The Imaging Issue in an Automatic Face/Disguise Detection System", IEEE, pp. 1-10, XP002596069, (2000).

Chang, Hong et al., "Multispectral Visible and Infrared Imaging for Face Recognition", IEEE, pp. 1-6, XP031285610, (Jun. 23, 2008).

Gonzalez, C. Rafael et al., "Digital Image Processing, $2^{nd}$ Edition", Prentice-Hall, Inc., pp. 1-20, XP002596070, ISBN: 0-201-18075-8, (Jan. 1, 2002).

Sonka, Milan et al., "Image Processing, Analysis, and Machine Vision", International Student Edition, pp. 1-26, XP002596071, ISBN: ISBN0-534-95393-X, (Jan. 1, 1988).

* cited by examiner

Image obtained when irradiated with 950 nm

Image obtained when irradiated with 870 nm

Image obtained when irradiated with 870 nm

INFORMATION PROCESSING APPARATUS AND INFORMATION PROCESSING METHOD

CROSS-REFERENCE TO RELATED APPLICATIONS

This is a divisional of and claims benefit of priority under 35 U.S.C. §120 from U.S. Application No. 13/058,948, filed Feb. 14, 2011, the entire content of which is incorporated herein by reference. U.S. Application No. 13/058,948 is a National Stage application of PCT/JP2010/003427, filed on May 21, 2010. This application is based upon and claims the benefit of priority from the prior Japanese Patent Application No. 2009-154921, filed Jun. 30, 2009, the entire content of which is hereby incorporated by reference.

TECHNICAL FIELD

The present invention relates to an information processing apparatus and an information processing method, and more particularly to, an information processing apparatus and an information processing method that are suitable in a case where a shape of a hand of a user or the like is extracted from a captured image obtained by capturing an image of the user, for example.

BACKGROUND ART

In recent years, there has been studied a data input technique of inputting data by using a gesture (motion) or a posture (pose) of a user as an input device for inputting data into a personal computer or the like, in addition to a mouse, a graphics tablet, and a touch pad.

Since data is input by using, for example, a gesture or a posture of a hand of a user in the data input technique, it is necessary to precisely extract a shape of the hand of the user from a captured image obtained by capturing an image of the user.

As extraction techniques for extracting the shape of the hand of the user, there are a pattern matching method using pattern matching of images, a skin area extraction method of extracting a skin area of the user, and the like.

In the pattern matching method, for example, a plurality of shape images obtained by capturing images of hands having various shapes and sizes are learned in advance, and a shape of a hand represented in a shape image that is most similar to the captured image (for example, shape image having a minimum sum of differences between pixel values of corresponding pixels) is extracted as the shape of the hand of the user.

In the pattern matching method, however, when a captured image is obtained under conditions (for example, image capturing direction, level of illumination, background, size of subject when image thereof is captured) that are different from those when shape images are captured, it may be difficult to precisely extract the shape of the hand of the user.

Particularly when a shape of a hand within a captured image is largely different from shapes of hands within shape images or when the hand within the captured image overlaps a face or the like in the case where the shape of the hand is extracted, the shape of the hand is difficult to be precisely extracted as compared to a case where a shape of the face is extracted, for example.

In addition, when the shape of the hand is required to be extracted in real-time, the pattern matching needs a huge amount of calculations, which causes a problem in many cases.

In the skin area extraction method, a skin area representing a skin of the user within the captured image is extracted using skin information expressing colors of the human skin.

However, in the skin area extraction method using the skin information, it is difficult to distinguish colors of the skin from colors close thereto. Further, since colors of the skin are different between races, it may be impossible to extract appropriate skin areas for all races.

In this regard, an extraction technique in which spectral reflectance characteristics are used for extracting a skin area within a captured image based on the fact that a reflectance change of the skin with respect to a wavelength is constant irrespective of a race is proposed recently (for example, see Non Patent Literature 1).

CITATION LIST

Non Patent Literature

[NPL 1]
Yasuhiro Suzuki et al., "Detection Method of Skin Region by Near-IR Spectrum Multi-Band", IEEJ Transactions on Electronics, Information and Systems Vol. 127, No. 4, 2007, Japan

SUMMARY OF INVENTION

However, in the above extraction technique of the related art in which the spectral reflectance characteristics are used, when a face and a hand of a subject are present within a captured image as skin areas, both shapes of the face and the hand are extracted as skin areas, and therefore it is difficult to extract only the shape of the hand as a skin area.

In view of the circumstances as described above, it is desirable to extract a precise shape of a hand or the like of a user at high-speed from a captured image obtained by capturing an image of the user while suppressing an increase of an amount of operations necessary for a series of processing.

According to an embodiment of the present invention, an information processing apparatus, method, computer-readable storage medium, and computer program are provided for detecting a plurality of pixels of interest within an image. The information processing apparatus includes a first memory configured to store a first image captured using light of a first wavelength and a second image captured using light of a second wavelength, which is different from the first wavelength. The information processing apparatus further includes at least one processor configured to detect a plurality of pixels of interest within the first captured image based on luminance values of the stored first and second captured images.

Further, according to another embodiment of the present invention, there are provided an information processing apparatus, method, computer-readable storage medium, and computer program for identifying luminance values corresponding to a predetermined object. The information processing apparatus includes a memory and at least one processor. The memory is configured to store a processed image that is generated from an image and includes a plurality of pixels of interest. The at least one processor is configured to determine frequencies of luminance values of the plurality of pixels of interest in the processed image, and to determine a range of luminance values corresponding to a predetermined object within the processed image based on the determined frequencies of the luminance values.

According to the embodiments of the present invention, it is possible to extract a precise shape of a hand of a user or the like at high-speed while suppressing an increase of an amount of operations necessary for a series of processing.

DESCRIPTION OF EMBODIMENTS

Hereinafter, an embodiment for carrying out the present invention (hereinafter, referred to as this embodiment) will be described. It should be noted that a description will be given in the following order.
1. This Embodiment (Example of Extracting Shape of Hand of User)
2. Modified Example 1. This Embodiment

[Structure Example of Information Processing System 1]

Figure 1:
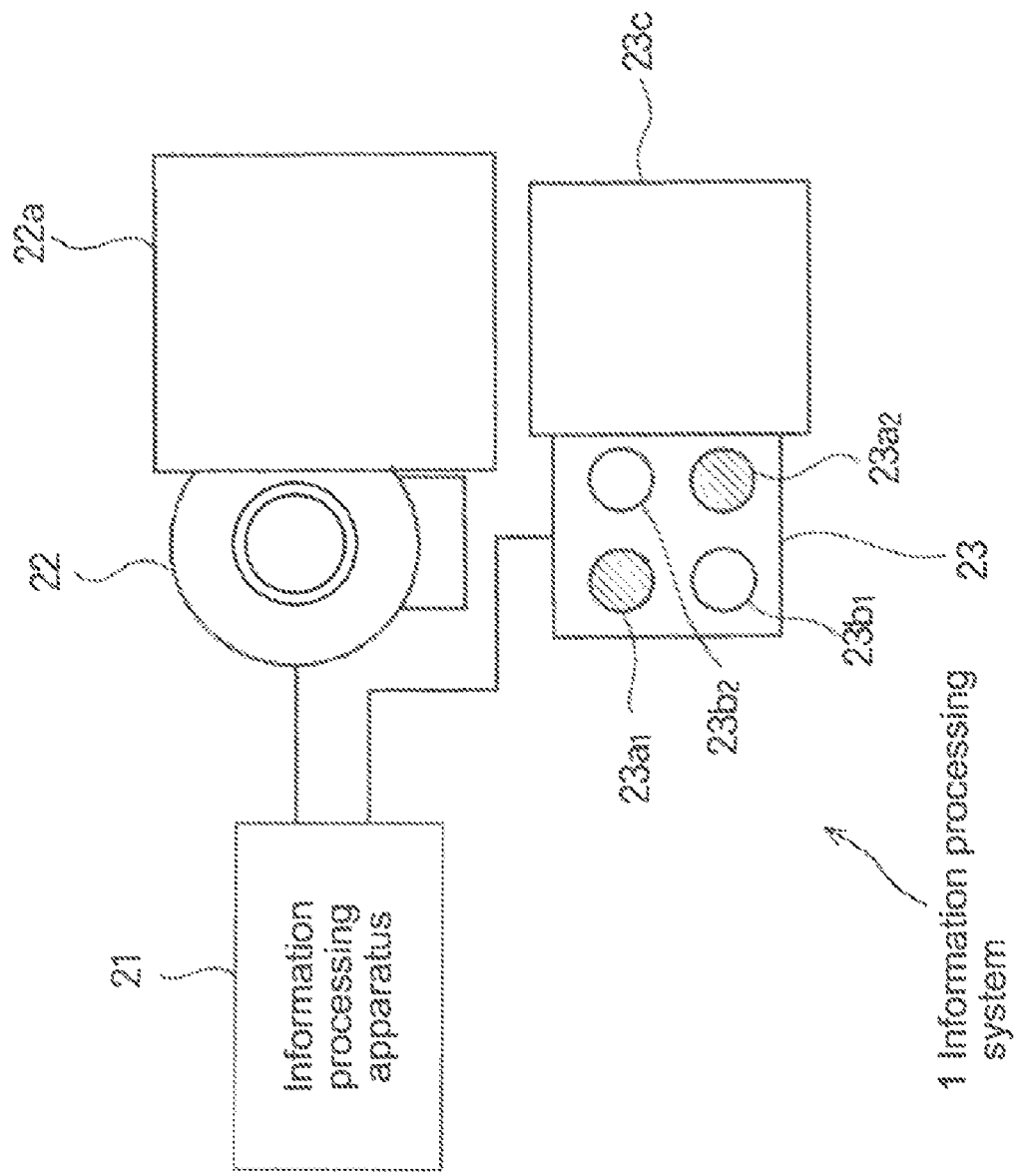
FIG. 1 is a block diagram showing a structure example of an information processing system.

FIG. 1 shows a structure example of an information processing system 1 of this embodiment.

The information processing system 1 executes predetermined processing in accordance with a gesture (or posture) made by using a hand of a user and includes an information processing apparatus 21, a camera 22, and a light-emitting apparatus 23.

In order to cause the information processing system 1 to execute the predetermined processing, the user changes a shape of his/her own hand (in front of lens surface of camera 22).

In this case, the information processing system 1 recognizes the shape of the hand of the user and executes the predetermined processing in accordance with the recognition result.

It should be noted that in this embodiment, the user changes the shape of the hand in front of the lens surface of the camera 22 and makes a gesture (or posture) by moving his/her hand toward a position closer to the lens surface of the camera 22 than his/her face, chest, or the like.

The information processing apparatus 21 controls the camera 22 and the light-emitting apparatus 23. Further, the information processing apparatus 21 recognizes the shape of the hand of the user based on a captured image captured by the camera 22, and executes the predetermined processing in accordance with the recognition result.

The camera 22 includes a lens used for capturing an image of a subject such as a user, and a front surface of the lens is covered with a visible light cut filter 22a that cuts off visible light.

With this structure, the camera 22 receives only reflected light of invisible light that is irradiated onto a subject by the light-emitting apparatus 23, except infrared components of fluorescent light or sunlight, and supplies the resultant captured image to the information processing apparatus 21.

Specifically, for example, the camera 22 receives only reflected light of light having a first wavelength, the light being invisible light irradiated onto a subject by the light-emitting apparatus 23 (for example, near-infrared light of 870 nm), and supplies the resultant first captured image to the information processing apparatus 21.

Further, the camera 22 receives only reflected light of light having a second wavelength different from the first wavelength, the light being invisible light irradiated onto the subject by the light-emitting apparatus 23 (for example, near-infrared light of 950 nm), and supplies the resultant second captured image to the information processing apparatus 21.

The light-emitting apparatus 23 includes LEDs (light emitting diodes) $23a_1$ and $23a_2$ that emit light having the first wavelength and LEDs $23b_1$ and $23b_2$ that emit light having the second wavelength.

It should be noted that in a case where the LEDs $23a_1$ and $23a_2$ need not to be distinguished from each other hereinafter, the LEDs $23a_1$ and $23a_2$ are referred to simply as LEDs 23a. Further, in a case where the LEDs $23b_1$ and $23b_2$ need not to be distinguished from each other, the LEDs $23b_1$ and $23b_2$ are referred to simply as LEDs 23b.

The LEDs 23a and 23b alternately emit light under control of the information processing apparatus 21.

Further, outputs of the LEDs 23a and LEDs 23b are adjusted so that intensities (amounts of light) of the reflected light received by the camera 22 become equal in the reflected light of the light having the first wavelength and the reflected light of the light having the second wavelength.

In addition, the LEDs 23a and LEDs 23b are alternately arranged in a grid as shown in FIG. 1 and a diffuser plate 23c that uniformly diffuses light emitted from the LEDs 23a and LEDs 23b is provided in front of the LEDs 23a and LEDs 23b. With this structure, the subject is irradiated with the light having first and second wavelengths without unevenness.

It should be noted that the light-emitting apparatus 23 is arranged at a position where the light emitted from the LEDs 23a or LEDs 23b is reliably irradiated onto at least a hand of a user. In this embodiment, the user changes a shape of a hand in front of the lens surface of the camera 22, and accordingly the light-emitting apparatus 23 is arranged close to the camera 22, for example.

[Structure Example of Information Processing Apparatus 21]

Figure 2:
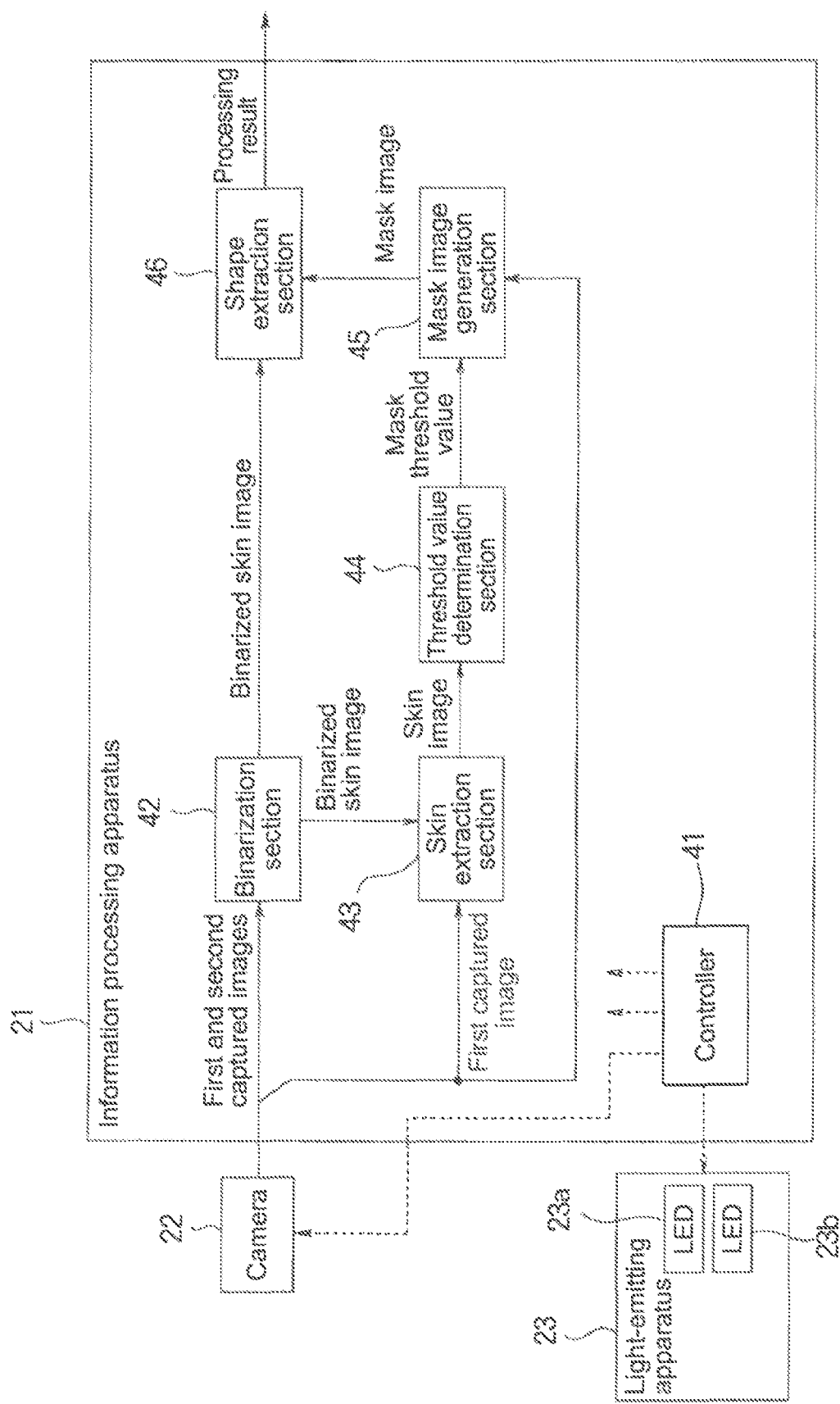
FIG. 2 is a block diagram showing a structure example of an information processing apparatus.

FIG. 2 shows a structure example of the information processing apparatus 21.

The information processing apparatus 21 includes a controller 41, a binarization section 42, a skin extraction section 43, a threshold value determination section 44, a mask image generation section 45, and a shape extraction section 46.

The controller 41 controls the light-emitting apparatus 23 and causes the LEDs 23a and LEDs 23b to emit light alternately.

The binarization section 42 is supplied with the first captured image and the second captured image from the camera 22. Based on the first and second captured images supplied from the camera 22, the binarization section 42 extracts (detects) pixels of interest. In one embodiment, the pixels of interest correspond to one or more skin areas representing the skin of the user and an area excluding the skin area from the first captured image.

Then, the binarization section 42 generates a binarized skin image obtained by binarizing pixel values of pixels constituting the extracted skin area and pixel values of pixels constituting the area excluding the skin area into different values (for example, 0 and 1), and supplies the binarized skin image to the skin extraction section 43 and the shape extraction section 46.

The skin extraction section 43 and the mask image generation section 45 are supplied with the first captured image from the camera 22.

Based on the binarized skin image supplied from the binarization section 42, the skin extraction section 43 extracts an area corresponding to the skin area within the binarized skin image (area representing skin area of user) from the first captured image supplied from the camera 22.

Then, the skin extraction section 43 generates a skin image including the extracted area and supplies the skin image to the threshold value determination section 44. It should be noted that the skin extraction section 43 may supply the extracted area as a skin image to the threshold value determination section 44.

The threshold value determination section 44 creates a histogram of a processed image such as the skin image (luminance values of pixels constituting skin image) based on the skin image supplied from the skin extraction section 43. Then, the threshold value determination section 44 determines a mask threshold value that is used for generating a mask image (described later) based on the created histogram of the skin image and supplies the mask threshold value to the mask image generation section 45.

The mask image generation section 45 generates a mask image from the first captured image supplied from the camera 22 based on the mask threshold value supplied from the threshold value determination section 44, and supplies the mask image to the shape extraction section 46.

It should be noted that the mask image is an image obtained by binarizing the first captured image into a mask area constituted of the pixels having luminance values within a range of luminance values specified by the mask threshold value and a non-mask area excluding the mask area.

Based on the mask image from the mask image generation section 45, the shape extraction section 46 extracts at least one predetermined object corresponding to a shape area representing the shape of the hand of the user, for example, as an area corresponding to the mask area within the mask image, from the binarized skin image supplied from the binarization section 42.

Then, the shape extraction section 46 recognizes the shape of the hand based on the extracted shape area, performs processing corresponding to the recognition result, and outputs the processing result to a subsequent stage.

It should be noted that the binarization section 42 extracts the skin area and the area excluding the skin area from the first captured image, but the binarization section 42 may extract a skin area and an area excluding the skin area from the second captured image. In this case, the skin extraction section 43 and the mask image generation section 45 are supplied with the second captured image from the camera 22, instead of the first captured image.

Then, the skin extraction section 43 generates a skin image from the second captured image and the mask image generation section 45 generates a mask image from the second captured image.

[Generation of Binarized Skin Image]

Next, processing in which the binarization section 42 generates a binarized skin image will be described in detail with reference to FIGS. 3 to 5.

It should be noted that in FIGS. 3 and 4, the first captured image and the second captured image that are captured by the camera 22 will be described. Further, in FIG. 5, a binarized skin image generated by the binarization section 42 based on the first captured image and the second captured image will be described.

Figure 3:
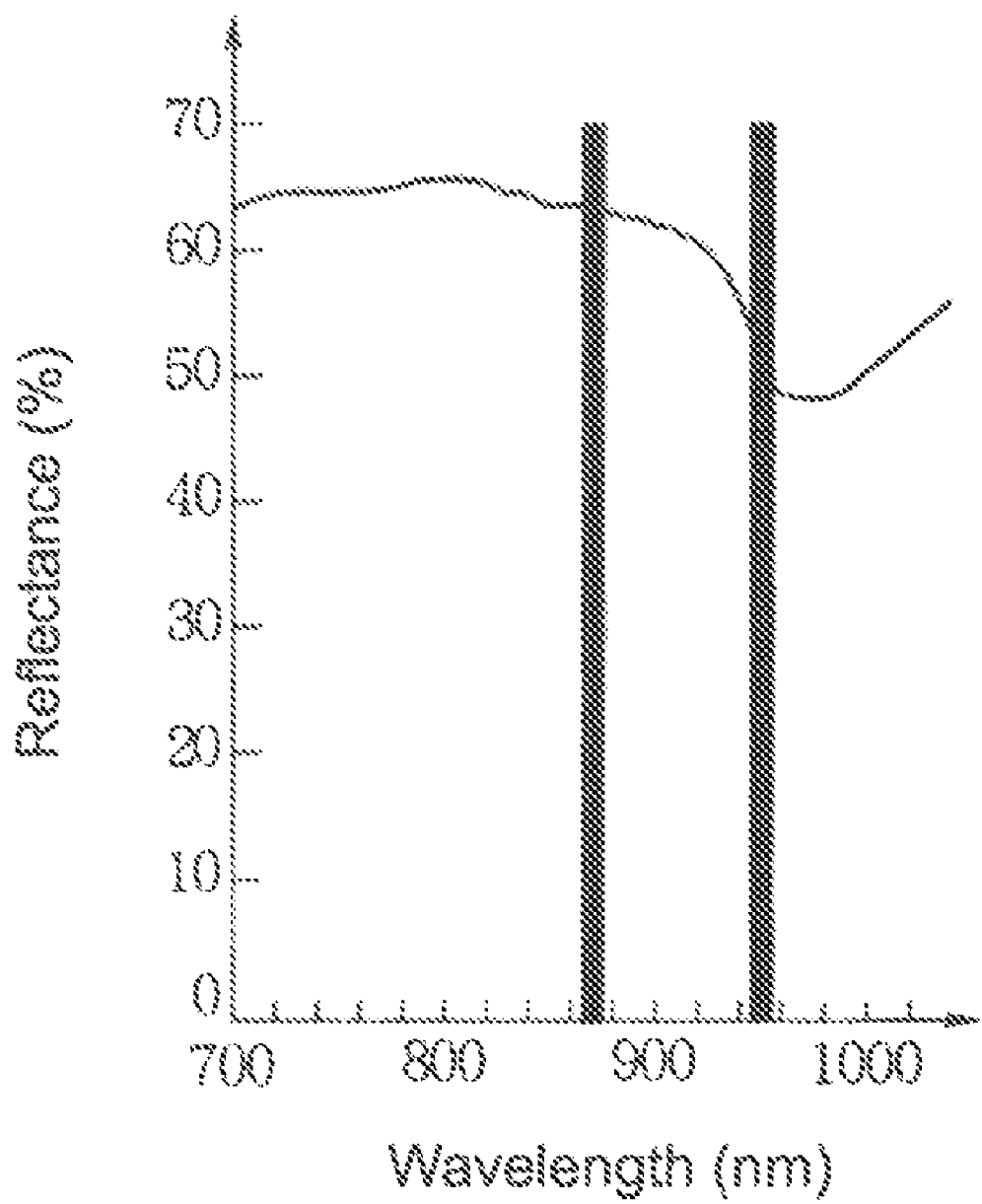
FIG. 3 is a diagram showing an example of reflection characteristics of a human skin.

FIG. 3 shows reflection characteristics of a human skin with respect to irradiation light having different wavelengths.

It should be noted that the reflection characteristics are universal irrespective of a difference in color of the human skin (difference in race) or a state of the skin (suntan or the like).

In FIG. 3, the horizontal axis represents a wavelength of light to be irradiated to the human skin, and the vertical axis represents a reflectance of the light irradiated to the human skin.

It is known that the reflectance of the light irradiated to the human skin sharply decreases from the vicinity of 900 nm with the vicinity of 800 nm as a peak, and increases again with the vicinity of 1,000 nm as a minimum value.

Specifically, as shown in FIG. 3, for example, a reflectance of reflected light that is obtained by irradiating light having a wavelength of 870 nm to the human skin is 63% and a reflectance of reflected light that is obtained by irradiating light having a wavelength of 950 nm to the human skin is 50%.

The above phenomenon is peculiar to the human skin, and regarding objects other than the skin of humans (for example, hair or clothes), a change in reflectance often becomes gentle in the vicinity of 800 to 1,000 nm.

Next, the first and second captured images captured by the camera 22 will be described with reference to FIG. 4.

FIG. 4 show examples of a first captured image obtained by receiving reflected light of light that has a wavelength of 870 nm and is irradiated to a user, and a second captured image obtained by receiving reflected light of light that has a wavelength of 950 nm and is irradiated to a user.

Figure 4B:
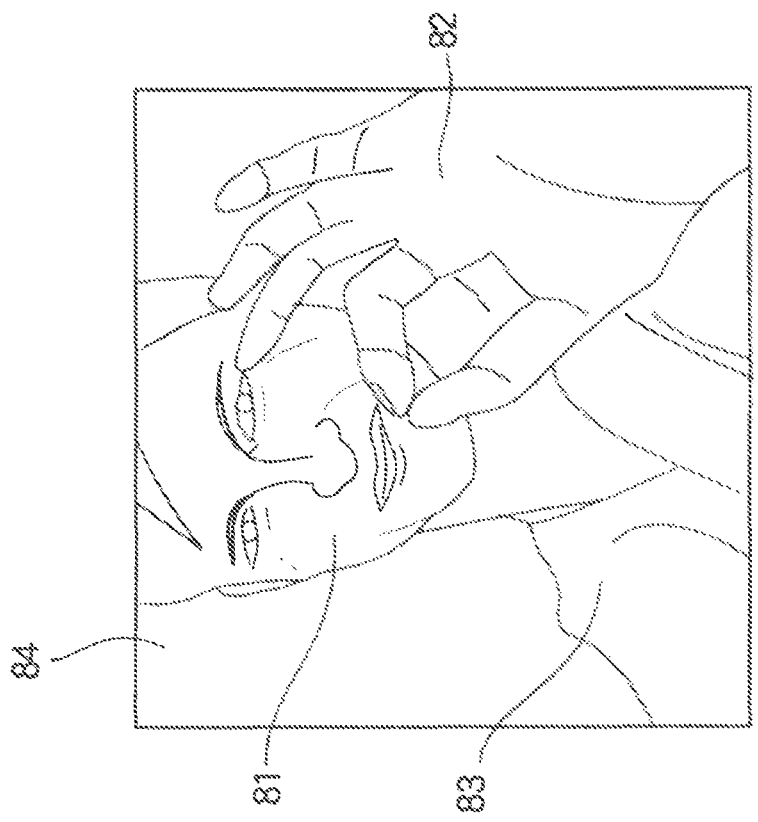
FIG. 4 are diagrams showing examples of first and second captured images.
Figure 4A:
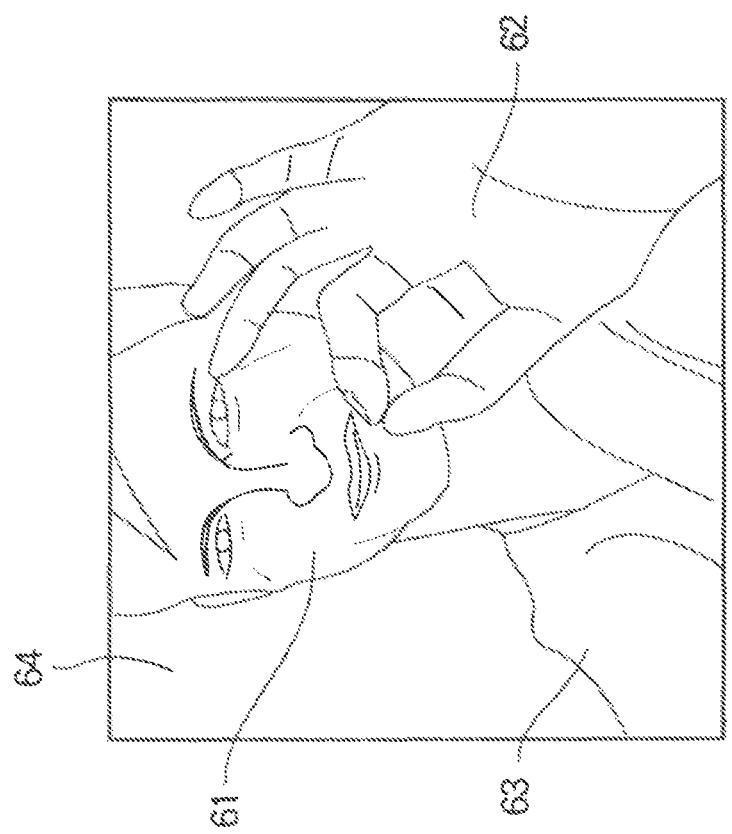

FIG. 4A shows the first captured image in which a face 61 and a hand 62 of the user are shown as a skin area of the user, and a shirt 63 that the user wears and a background 64 are shown as an area excluding the skin area of the user.

FIG. 4B shows the second captured image in which a face 81 and a hand 82 of the user are shown as a skin area of the user, and a shirt 83 that the user wears and a background 84 are shown as an area excluding the skin area of the user.

As described in FIG. 3, as to the reflection characteristics in the skin portion of the user, the reflectance of the light having the wavelength of 870 nm is larger than the reflectance of the light having the wavelength of 950 nm.

Accordingly, in a case where the light having the wavelength of 870 nm is irradiated to the user, as reflected light of the light irradiated to the skin portion of the user, light brighter than the reflected light of the light having the wavelength of 950 nm enters the lens of the camera 22.

As a result, luminance values of pixels constituting the skin area of the user (face 61 and hand 62) within the first captured image take larger values than luminance values of pixels constituting the skin area of the user (face 81 and hand 82) within the second captured image.

Accordingly, differences obtained by subtracting the luminance values of the pixels constituting the skin area of the user within the second captured image from the luminance values of the pixels constituting the corresponding skin area of the user within the first captured image take positive values.

In contrast to the above, as to the reflection characteristics in the portion excluding the skin portion of the user, the reflectance of the light having the wavelength of 870 nm is equal to or smaller than that of the light having the wavelength of 950 nm in some cases.

Accordingly, in a case where the light having the wavelength of 870 nm is irradiated to the user, as reflected light of the light irradiated to the portion excluding the skin portion of the user, light that is as bright as or darker than the reflected light of the light having the wavelength of 950 nm enters the lens of the camera 22.

As a result, luminance values of pixels constituting the area excluding the skin area of the user (shirt 63 and background 64) within the first captured image take values equal to or smaller than luminance values of pixels constituting the area excluding the skin area of the user (shirt 83 and background 84) within the second captured image.

Accordingly, differences obtained by subtracting the luminance values of the pixels constituting the skin portion of the user within the second captured image from the luminance values of the pixels constituting the corresponding portion excluding the skin portion of the user within the first captured image take values equal to or smaller than 0 (values excluding positive values).

Consequently, the binarization section 42 calculates differences between luminance values of corresponding pixels of the first captured image and the second captured image and extracts pixels of interest (e.g., the skin area) and the area excluding the skin area of the user based on the calculated differences. Then, the binarization section 42 generates a binarized skin image in which the extracted skin area of the user is represented by a value 1 and the area excluding the extracted skin area of the user is represented by a value 0.

In other words, for example, in a case where the calculated differences are positive values, the binarization section 42 extracts the corresponding pixels as those constituting the skin area of the user, and in a case where the calculated differences are not positive values, extracts the corresponding pixels as those constituting the area excluding the skin area of the user.

Then, the binarization section 42 sets each of the values of the pixels extracted as those constituting the skin area of the user to 1, and each of the values of the pixels extracted as those constituting the area excluding the skin area of the user to 0 to thereby generate a binarized skin image, and supplies the binarized skin image to the skin extraction section 43 and the shape extraction section 46.

It should be noted that a case where the differences calculated for the portion excluding the skin portion are smaller than those calculated for the skin portion but take positive values may occur depending on a reflectance in the portion excluding the skin option of the user. Therefore, in a case where the differences take positive values but are smaller than a predetermined threshold value, it may be desirable to assume that the differences are those of the portion excluding the skin portion of the user and set the value 0 for that portion.

Further, the binarization section 42 may calculate difference absolute values between luminance values of corresponding pixels of the first captured image and the second captured image, and based on whether the calculated difference absolute values are equal to or larger than a predetermined threshold value, extract the skin portion (skin area) of the user and the portion excluding the skin portion (area excluding the skin area) to generate a binarized skin image.

The above operation uses the fact that due to the reflection characteristics, the difference absolute values corresponding to the skin portion of the user take relatively large values and those corresponding to the portion excluding the skin portion of the user take relatively small values.

Figure 5:
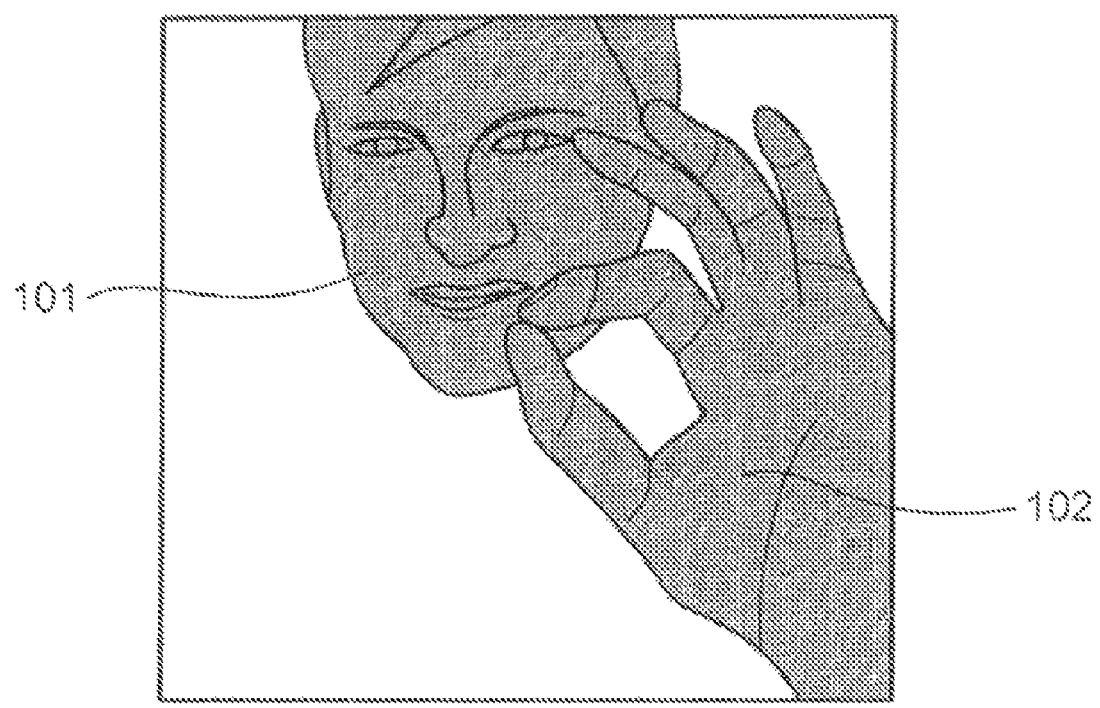
FIG. 5 is a diagram showing an example of a binarized skin image generated by a binarization section.

Next, FIG. 5 shows an example of the binarized skin image generated by the binarization section 42.

In the binarized skin image shown in FIG. 5, a portion shown in black indicates a skin area represented by the value 1. The skin area includes a face area 101 indicating a skin portion of the face of the user, and a hand area 102 indicating a skin portion of the hand of the user.

It should be noted that the face area 101 shown in FIG. 5 includes eyebrows, eyes, hair, and the like in addition to the skin portion of the face for convenience of the illustration, but the face area 101 is constituted of only the skin portion of the face in actuality.

In addition, in the binarized skin image shown in FIG. 5, a portion shown in white indicates an area excluding the skin area and is represented by the value 0.

The binarization section 42 supplies the generated binarized skin image to the skin extraction section 43 and the shape extraction section 46.

The skin extraction section 43 extracts, from the first captured image supplied from the camera 22, an area corresponding to the face area 101 and the hand area 102 within the binarized skin image (area including face 61 and hand 62) based on the binarized skin image supplied from the binarization section 42. Then, the skin extraction section 43 generates a skin image including the extracted area.

[Generation of Skin Image]

Subsequently, processing in which the skin extraction section 43 generates a processed image (e.g., a skin image) from the first captured image based on the binarized skin image supplied from the binarization section 42 will be described with reference to FIG. 6.

Figure 6:
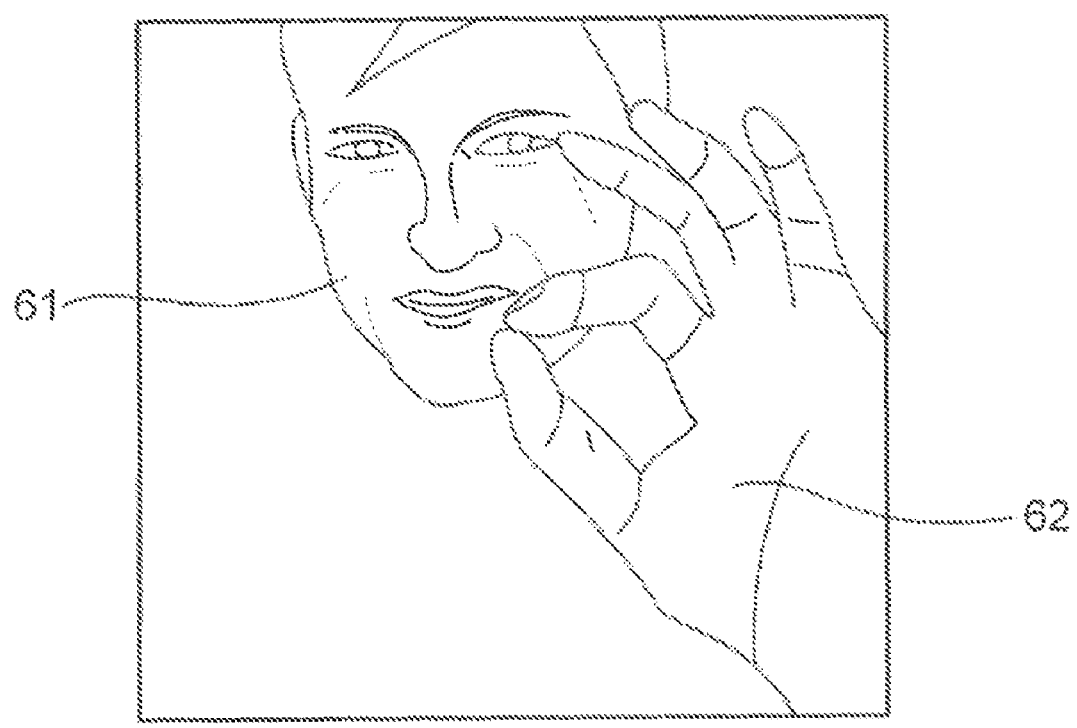
FIG. 6 is a diagram showing an example of a skin image extracted by a skin extraction section.

FIG. 6 shows an example of the skin image extracted by the skin extraction section 43. The skin image shown in FIG. 6 shows the face 61 and the hand 62 of the user.

It should be noted that the skin image shown in FIG. 6 includes eyebrows, eyes, hair, and the like as the face 61 of the user in addition to the skin portion of the face for convenience of the illustration, but the face 61 shown in FIG. 6 represents only the skin portion of the face in actuality.

The skin extraction section 43 multiplies the luminance values of the pixels of the binarized skin image supplied from the binarization section 42 and those of corresponding pixels of the first captured image supplied from the camera 22.

Then, the skin extraction section 43 extracts, out of the pixels constituting the first captured image, an area constituted of pixels whose multiplication results are not 0 (area including face 61 and hand 62) and generates a skin image including the extracted area.

Accordingly, out of the areas within the first captured image, the face 61 included in the area corresponding to the face area 101 of the binarized skin image and the hand 62 included in the area corresponding to the hand area 102 of the binarized skin image are extracted as they are. The area corresponding to the area excluding the skin area in the binarized skin image (shown in white in FIG. 6) is given a luminance value of 225, and then a skin image as shown in FIG. 6 is generated from the first captured image.

The skin extraction section 43 supplies the generated skin image to the threshold value determination section 44.

The threshold value determination section 44 determines a mask threshold value used for generating a mask image based on the skin image supplied from the skin extraction section 43.

[Determination of Mask Threshold Value]

Next, processing in which the threshold value determination section 44 determines a mask threshold value will be described in detail with reference to FIG. 7.

Figure 7:
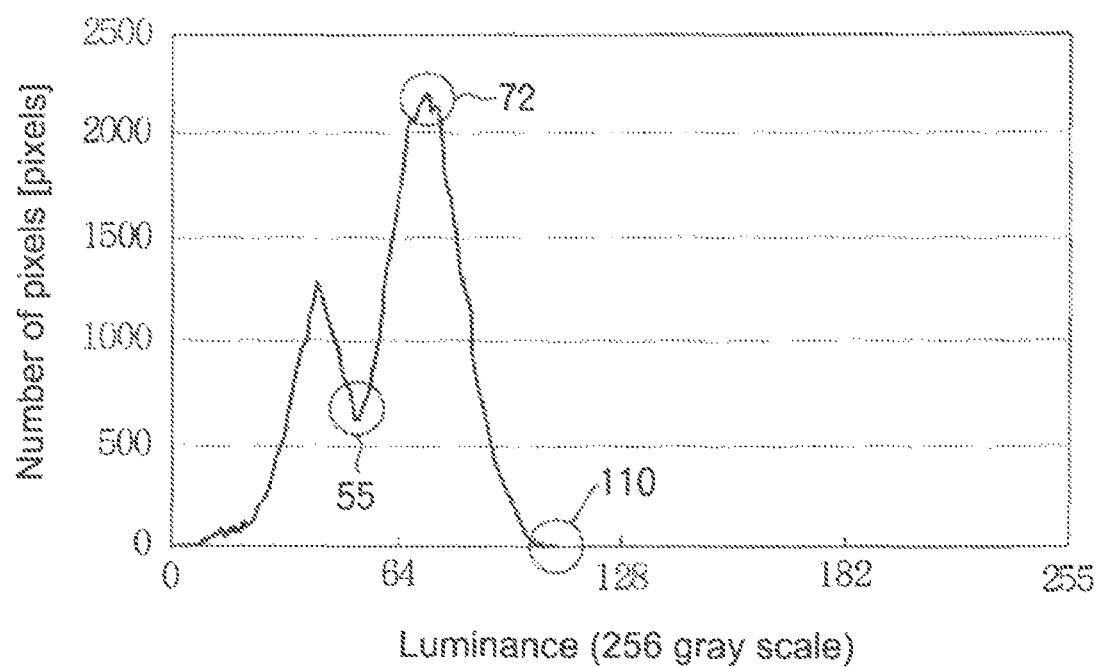
FIG. 7 is a diagram showing an example of a histogram of a skin image.

FIG. 7 shows an example of a histogram of the skin image.

In FIG. 7, the horizontal axis indicates luminance values of pixels constituting the skin image. Further, the vertical axis indicates the number of pixels corresponding to the luminance values of the horizontal axis.

It should be noted that the number of pixels constituting the area shown in white and having the luminance values of 225 in the skin image of FIG. 6 is normally shown in the histogram of FIG. 7, but illustration thereof is omitted because the number of pixels having the luminance values of 225 is not used for determining the mask threshold value.

The threshold value determination section 44 creates a histogram as shown in FIG. 7 regarding the luminance values of the pixels constituting the skin image supplied from the skin extraction section 43.

In the histogram of FIG. 7, a large number of pixels are concentrated between a luminance value 0 and a luminance value 54 and between a luminance value 55 and a luminance value 110. That is, in the histogram of FIG. 7, a plurality of pixels of interest are grouped into two separate groups.

Incidentally, as described above, it is assumed that the hand is located close to the camera 22 and the face, chest, or the like is located far from the camera 22.

For example, since the LEDs 23a and LEDs 23b of the light-emitting apparatus 23 emit light while being close to the camera 22, a body part of the user (in this case, hand) that is located closer to the camera 22 (light-emitting apparatus 23) has a larger luminance value and a body part of the user (in this case, face or the like) that is located farther from the camera 22 has a smaller luminance value.

Accordingly, the luminance values of the pixels constituting the skin portion of the hand that is located close to the camera 22 takes larger values than those of the pixels constituting the skin portion of the face that is located far from the camera 22.

Therefore, the luminance values between the luminance value 0 and the luminance value 54 are those of the pixels constituting the face 61 (area thereof), and the luminance values between the luminance value 55 and the luminance value 110 are those of the pixels constituting a predetermined object such as the hand 62.

The threshold value determination section 44 determines a minimum luminance value (in this example, luminance value 55) as a lower limit threshold value Th_L and a maximum luminance value (in this case, luminance value 110) as an upper limit threshold value Th_H.

Then, the threshold value determination section 44 supplies the determined lower limit threshold value Th_L and upper limit threshold value Th_H, as mask threshold values, to the mask image generation section 45.

Based on the mask threshold values (lower limit threshold value Th_L and upper limit threshold value Th_H) supplied from the threshold value determination section 44, the mask image generation section 45 detects a mask area and a non-mask area from the first captured image supplied from the camera 22, and generates a mask image in which the detected mask area and non-mask area are binarized into different values.

[Generation of Mask Image]

Next, processing in which the mask image generation section 45 generates a mask image based on the mask threshold values from the threshold value determination section 44 will be described in detail with reference to FIG. 8.

Figure 8:
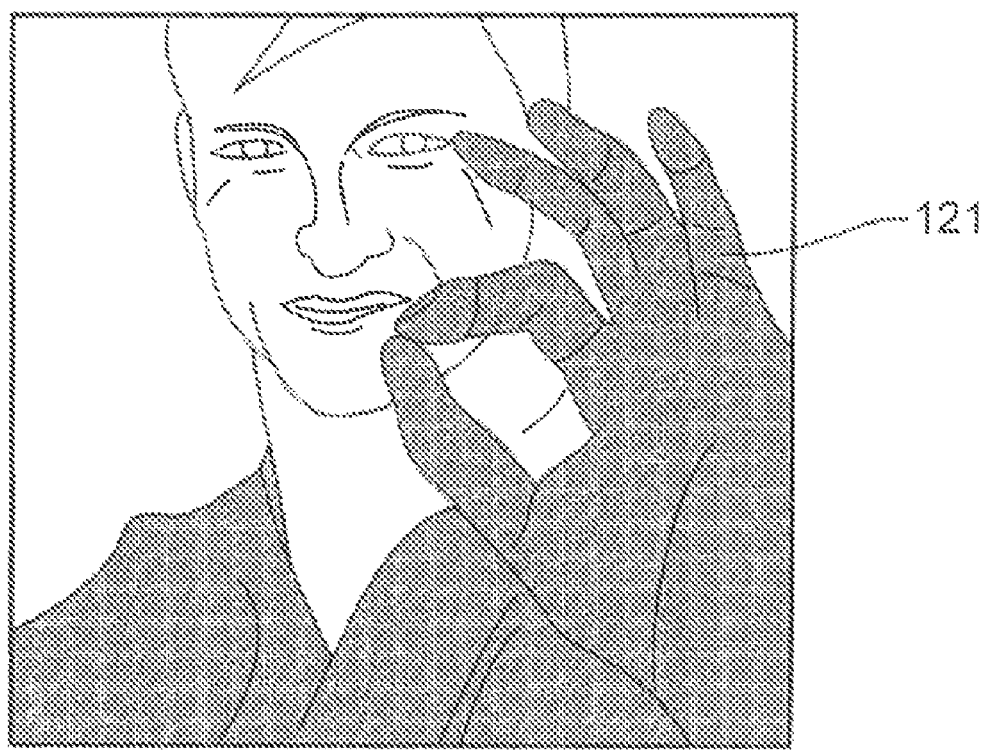
FIG. 8 is a diagram showing an example of a mask image generated by a mask image generation section.

FIG. 8 shows an example of the mask image. In the mask image shown in FIG. 8, a mask area 121 shown in black is an area having luminance values of the lower limit threshold value Th_L or more and the upper limit threshold value Th_H or less within the corresponding first captured image.

Further, the non-mask area shown in white in the mask image shown in FIG. 8 is an area having luminance values that are lower than the lower limit threshold value Th_L or larger than the upper limit threshold value Th_H within the corresponding first captured image.

In a case where the luminance values of the pixels constituting the first captured image supplied from the camera 22 are equal to or larger than the lower limit threshold value Th_L and equal to or smaller than the upper limit threshold value Th_H, the mask image generation section 45 detects the pixels having such luminance values as pixels included in the mask area and converts each of those luminance values into the value 1.

Further, in a case where the luminance values of the pixels constituting the first captured image supplied from the camera 22 are smaller than the lower limit threshold value Th_L or larger than the upper limit threshold value Th_H, the mask image generation section 45 detects the pixels having such luminance values as pixels included in the non-mask area and converts each of those luminance values into the value 0.

Accordingly, the mask image generation section 45 generates the mask image that is constituted of the mask area 121 (shown in black) constituted of the pixels each having the value 1 and the non-mask area (shown in white) constituted of the pixels each having the value 0, and supplies the mask image to the shape extraction section 46.

Based on the mask image supplied from the mask image generation section 45, the shape extraction section 46 extracts, for example, a shape area representing the shape of the hand of the user as an area corresponding to the mask area 121 within the mask image, from the face area 101 and the hand area 102 within the binarized skin image supplied from the binarization section 42.

[Extraction of Shape of Hand]

Next, processing in which the shape extraction section 46 extracts the shape of the hand of the user from the binarized skin image will be described in detail with reference to FIG. 9.

Figure 9:
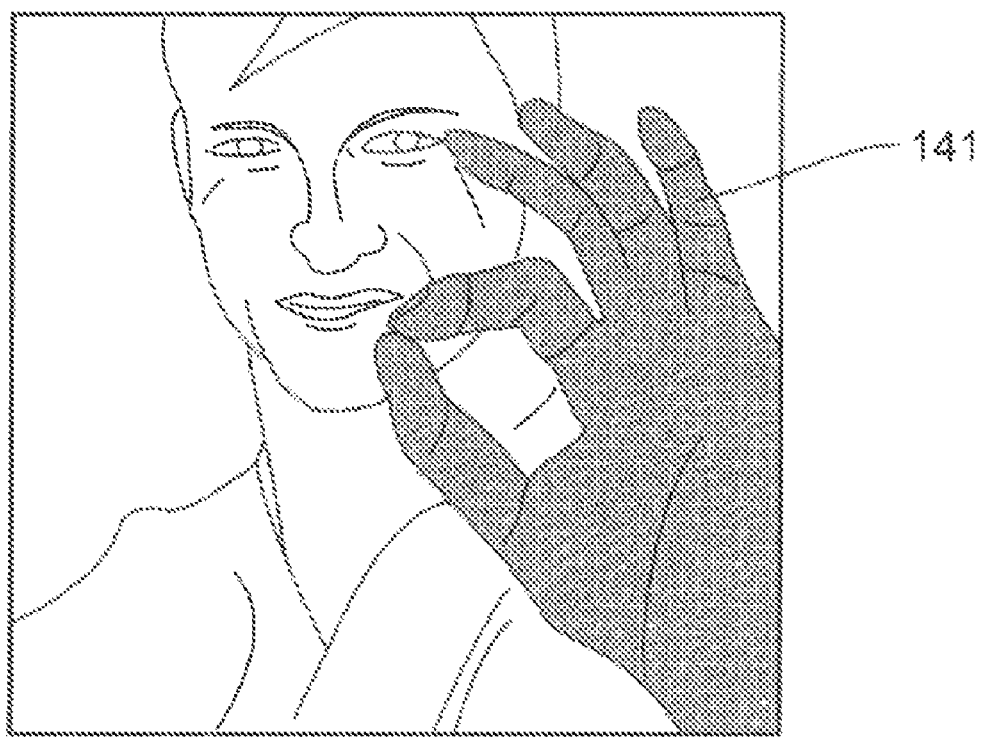
FIG. 9 is a diagram showing an example of an extracted image generated by a shape extraction section.

FIG. 9 shows a display example of the extracted image including the shape area that is extracted by the shape extraction section 46.

In the extracted image shown in FIG. 9, a shape area 141 is a shape of a hand of the user.

The shape extraction section 46 multiplies the luminance values of the pixels constituting the mask image supplied from the mask image generation section 45 and those of corresponding pixels constituting the binarized skin image supplied from the binarization section 42.

Then, the shape extraction section 46 extracts, as the shape area 141, an area within the binarized skin image in which multiplication results are not 0, that is, out of the face area 101 and the hand area 102 within the binarized skin image (FIG. 5), a portion overlapping the mask area 121 within the mask image (FIG. 8).

Further, the shape extraction section 46 recognizes the shape of the hand of the user based on the extracted shape area 141, and performs processing corresponding to the recognition result.

It should be noted that the mask area 121 within the mask image shown in FIG. 8 includes the shirt that the user wears, in addition to the hand of the user.

However, since the face area 101 and the hand area 102 within the binarized skin image do not include the shirt that the user wears, the shape extraction section 46 can precisely extract the shape area 141 that represents only the shape of the hand without extracting the area representing the shape of the shirt.

[Description on Operation of Shape Extraction Processing]

Next, shape extraction processing in which the information processing system 1 extracts the shape of the hand of the user or the like will be described in detail.

Figure 10:
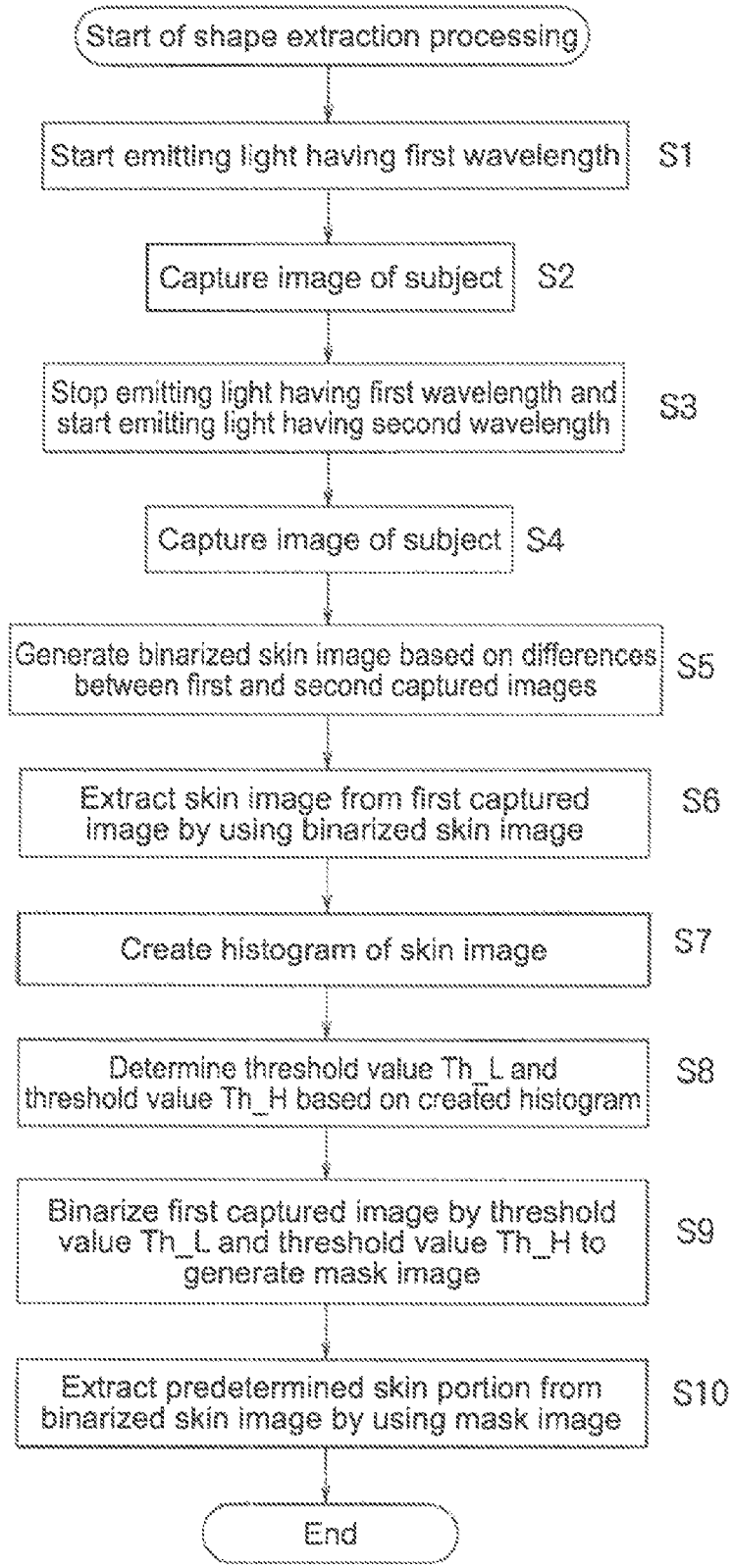
FIG. 10 is a flowchart for explaining shape extraction processing.

FIG. 10 is a flowchart for explaining the shape extraction processing. It should be noted that the shape extraction processing is repeatedly performed from a time when a power of the information processing system 1 is turned on.

Hereinafter, the shape extraction processing performed when the user is in front of the camera 22 will be described.

In Step S1, the controller 41 controls the LEDs 23a of the light-emitting apparatus 23 to start emitting the light having the first wavelength. It should be noted that in a case where the LEDs 23b are emitting light, the controller 41 stops the emission of the light of the LEDs 23b and then causes the LEDs 23a to start emitting light.

In Step S2, the camera 22 captures an image of the user irradiated with the light having the first wavelength, and supplies the resultant first captured image to the information processing apparatus 21.

In Step S3, the controller 41 controls the LEDs 23a of the light-emitting apparatus 23 to stop emitting the light having the first wavelength, and controls the LEDs 23b of the light-emitting apparatus 23 to start emitting the light having the second wavelength.

In Step S4, the camera 22 captures an image of the user irradiated with the light having the second wavelength, and supplies the resultant second captured image to the information processing apparatus 21.

In Step S5, the binarization section 42 generates a binarized skin image shown in FIG. 5 based on the differences between luminance values of corresponding pixels of the first captured image and the second captured image that are supplied from the camera 22, and supplies the binarized skin image to the skin extraction section 43 and the shape extraction section 46.

In Step S6, the skin extraction section 43 extracts an area corresponding to the skin area (area representing skin portion of user) within the binarized skin image from the first captured image supplied from the camera 22, based on the binarized skin image supplied from the binarization section 42.

Then, the skin extraction section 43 generates a skin image including the extracted area and supplies the skin image to the threshold value determination section 44.

In Step S7, the threshold value determination section 44 creates a histogram of the skin image as shown in FIG. 7 based on the luminance values of the pixels constituting the skin image supplied from the skin extraction section 43.

In Step S8, the threshold value determination section 44 determines a luminance value with a minimal number of pixels as a lower limit threshold value Th_L and a maximum luminance value as an upper limit threshold value Th_H, based on the created histogram of the skin image.

Then, the threshold value determination section 44 supplies the determined lower limit threshold value Th_L and upper limit threshold value Th_H, as mask threshold values, to the mask image generation section 45.

In Step S9, the mask image generation section 45 binarizes the first captured image supplied from the camera 22 based on the mask threshold values (lower limit threshold value Th_L and upper limit threshold value Th_H) supplied from the threshold value determination section 44 to generate a mask image as shown in FIG. 8, and supplies the mask image to the shape extraction section 46.

In Step S10, based on the mask image supplied from the mask image generation section 45, the shape extraction section 46 extracts, for example, an extraction area representing a shape of a hand of the user as an area corresponding to the mask area within the mask image, from the binarized skin image supplied from the binarization section 42.

Then, the shape extraction section 46 recognizes the shape of the hand by the extracted area thus extracted, performs processing corresponding to the recognition result, and outputs the processing result to a subsequent stage.

With the above processing, the shape extraction processing is terminated.

As described above, in the shape extraction processing, the mask image is generated from the first captured image captured by one camera 22 based on the mask threshold values, and the shape of the hand of the user is extracted from the binarized skin image based on the generated mask image.

Accordingly, it is possible to reduce an amount of calculations necessary for generating the mask image and extract the shape of the hand of the user with a smaller number of components, for example, as compared to a case where based on a plurality of captured images captured by a plurality of cameras, a distance image expressing a distance between the cameras and a hand of a user or the like is generated and the shape of the hand of the user is extracted using the distance image as a mask image.

Further, in the shape extraction processing, based on the difference between a distance from the camera 22 to the face of the user and a distance from the camera 22 to the hand thereof, the mask image that includes the mask area 121 including only a skin portion of the hand as a skin portion without including the skin portion of the face and the non-mask area is generated.

Accordingly, even when the hand area 102 including the hand to be extracted overlaps the face area 101 including the face as a skin portion other than the hand in the binarized skin image, the mask area 121 includes, as a skin portion, only the skin portion of the hand without including that of the face, with the result that only the hand area 102 can be extracted from the binarized skin image.

Consequently, it becomes possible to precisely extract the shape of the hand of the user.

Moreover, in the shape extraction processing, invisible near-infrared rays (light) that cannot be seen by humans are emitted from the LEDs 23a and LEDs 23b.

Accordingly, since the user cannot visually recognize the light emitted from the LEDs 23a and LEDs 23b, the user does not feel uncomfortable due to bright light emitted from the LEDs 23a and LEDs 23b.

Moreover, the diffuser plate 23c is provided in front of the LEDs 23a and LEDs 23b in the light-emitting apparatus 23 of the information processing system 1.

With this structure, the invisible light emitted from the LEDs 23a and LEDs 23b is uniformly diffused. Therefore, uniform light without unevenness caused by an amount of light is irradiated to a subject.

Accordingly, reflected light of the invisible light irradiated to the subject is received by the camera 22 as uniform light without unevenness caused by an amount of light, with the result that the first and second captured images without unevenness caused by the amount of light can be obtained by the camera 22.

Accordingly, since the first and second captured image without unevenness caused by the amount of light are used for extracting the shape of the hand or the like in the information processing system 1, it becomes possible to extract the shape of the hand or the like more precisely than a case where first and second captured images with unevenness caused by the amount of light are used, for example.

It should be noted that in the information processing system 1, it is desirable to extract the shape of the hand in about 80 ms from a start of the shape extraction processing so that the shape of the hand after being changed can be recognized each time the user changes the shape of the hand.

2. Modified Example

In the shape extraction processing described above, the skin image is extracted and the mask threshold values (lower limit threshold value Th_L and upper limit threshold value Th_H) are determined based on the histogram of the extracted skin image through the processing of Steps S6 to S8 every time the shape extraction processing is performed, but the shape extraction processing is not limited thereto.

In other words, for example, in the shape extraction processing, the mask threshold values previously determined in Steps S6 to S8 may be used as they are when the shape extraction processing is performed.

In this case, since the processing in Steps S6 to S8 can be omitted, it is possible to rapidly extract the shape of the hand or the like by the shape extraction processing.

Further, by performing the same processing as the processing in Steps S6 to S8 before performing the shape extraction processing to determine mask threshold values in advance, it is also possible to omit the processing in Steps S6 to S8 in the shape extraction processing.

It should be noted that as the processing of determining the mask threshold values in advance before performing the shape extraction processing, it is additionally possible to determine the mask threshold values based on an average value of luminance values of pixels constituting the hand area of the user, for example.

[Method of Determining Mask Threshold Values]

Next, FFT (Fast Fourier Tansform) threshold value determination processing in which the threshold value determination section 44 determines mask threshold values based on an average value of luminance values of pixels constituting the hand area of the user will be described with reference to FIG. 11.

Figure 11:
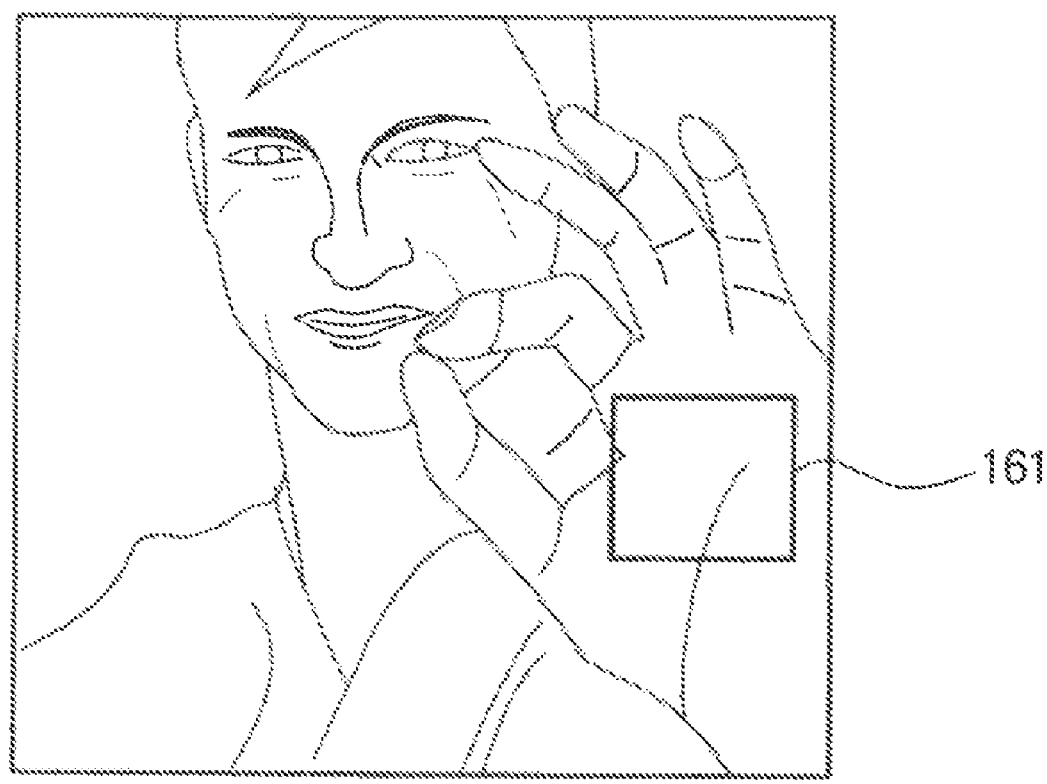
FIG. 11 is a diagram showing the first captured image that is used in FFT threshold value determination processing.

FIG. 11 shows an example of a first captured image obtained by capturing an image of the user irradiated with light having a wavelength of 870 nm.

It should be noted that when the FFT threshold value determination processing is performed, the threshold value determination section 44 is supplied, from the camera 22, with a plurality of first captured images obtained by capturing images of a user waving the hand by the camera 22.

The threshold value determination section 44 performs the FFT processing on the plurality of first captured images and detects a hand area within the first captured image, the hand area moving at a constant frequency.

Then, the threshold value determination section 44 calculates an average value ave_L of luminance values of pixels constituting a rectangular area 161 that is a part of the detected hand area.

Further, the threshold value determination section 44 determines a value ave_L-a obtained by subtracting an adjustment value a from the average value ave_L as a lower limit threshold value Th_L and a value ave_L+b obtained by adding an adjustment value b to the average value ave_L as an upper limit threshold value Th_H.

It should be noted that the adjustment values a and b are values used for adjusting the average value ave_L and determining the lower limit threshold value Th_L and the upper limit threshold value Th_H.

The adjustment values a and b are variables calculated in accordance with intensities of light (amounts of light) emitted from the LEDs 23a and LEDs 23b, a distance from the camera 22 to the user, and light sensitivity of a CCD (Charge Coupled Device Image Sensor) used in the camera 22, but the variables are experimentally calculated in actuality in many cases.

[Description on Operation by FFT Threshold Value Determination Processing]

Next, the FFT threshold value determination processing in which the threshold value determination section 44 determines mask threshold values based on the average value of the luminance values of the pixels constituting the hand area of the user will be described.

Figure 12:
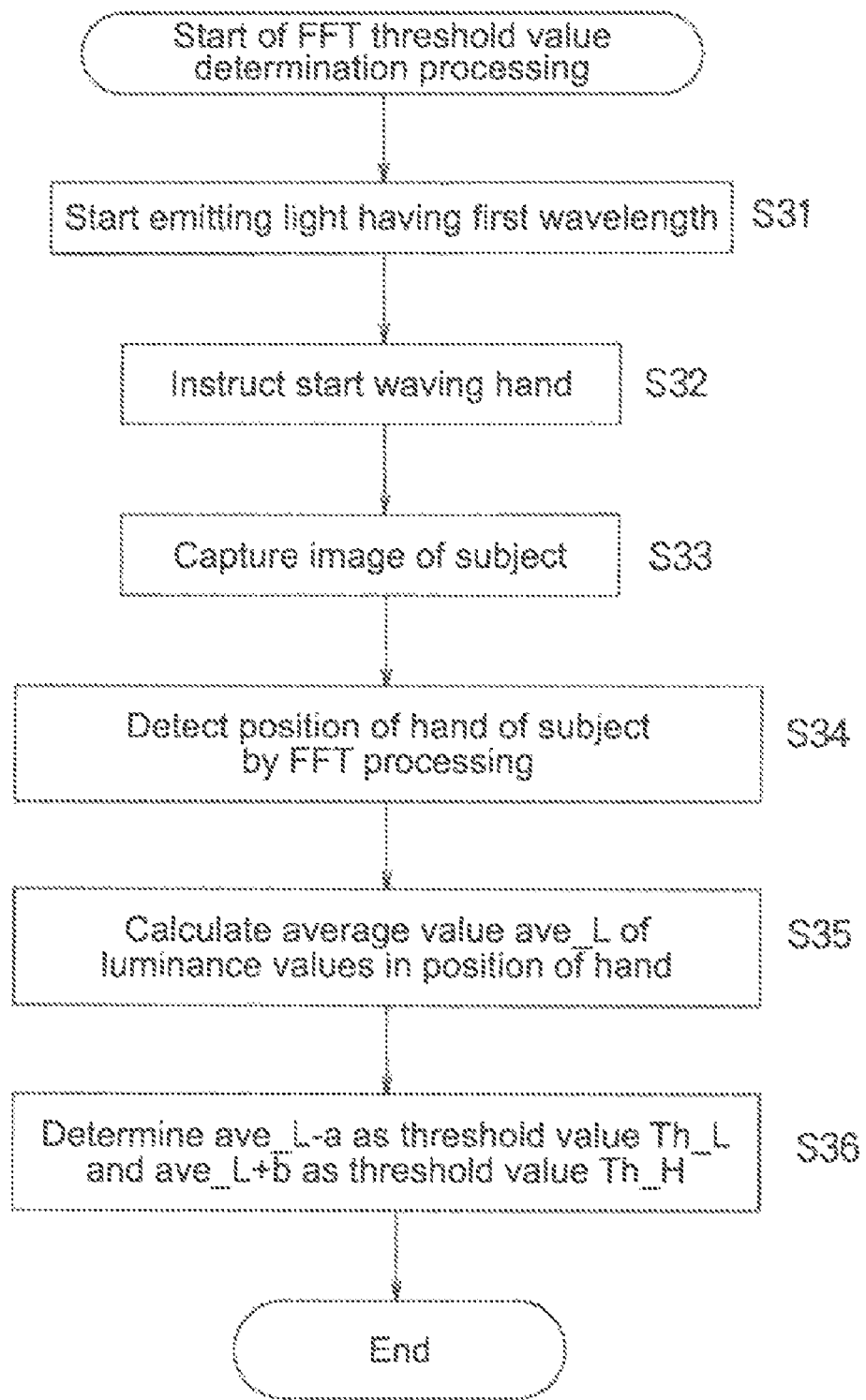
FIG. 12 is a flowchart for explaining the FFT threshold value determination processing.

FIG. 12 is a flowchart for explaining the FFT threshold value determination processing. The FFT threshold value determination processing is started, for example, when a power of the information processing system is turned on and before the shape extraction processing is performed.

In Step S31, the controller 41 controls the LEDs 23a of the light-emitting apparatus 23 to start emitting the light having the first wavelength.

In Step S32, the controller 41 controls a display, a speaker, or the like (not shown) provided in the information processing apparatus 21 to instruct a user to wave the hand.

In Step S33, the camera 22 captures images of the user waving the hand and supplies the resultant first captured images to the threshold value determination section 44 of the information processing apparatus 21.

In Step S34, the threshold value determination section 44 performs the FFT processing on the first captured images and detects a hand area within the first captured image, the hand area moving at a constant frequency.

In Step S35, the threshold value determination section 44 calculates an average value ave_L of the luminance values of the pixels constituting the rectangular area 161 that is a part of the detected hand area.

In Step S36, the threshold value determination section 44 determines a value ave_L-a obtained by subtracting an adjustment value a from the average value ave_L as a lower limit threshold value Th_L and a value ave_L+b obtained by adding an adjustment value b to the average value ave_L as an upper limit threshold value Th_H.

With the above processing, the FFT threshold value determination processing is terminated. As described above, the mask threshold values are determined before the shape extraction processing is performed in the FFT threshold value determination processing, with the result that it is also possible to omit the processing in Steps S6 to S8 and extract the shape of the hand or the like more rapidly in the shape extraction processing.

It should be noted that in the FFT threshold value determination processing, the FFT processing is performed on the plurality of first captured images to detect the hand area within the first captured image and the mask threshold values (lower limit threshold value Th_L and upper limit threshold value Th_H) based on the average value of the luminance values of the pixels within the hand area, but the FFT threshold value determination processing is not limited thereto.

In other words, for example, in the FFT threshold value determination processing, by performing the FFT processing on a plurality of second captured images obtained by capturing images of the user waving the hand by the camera 22, it may be possible to detect a hand area within the second captured image and determine mask threshold values based on an average value of luminance values of pixels within the hand area.

In this embodiment, the binarization section 42 extracts the skin area of the user and the area excluding the skin area of the user from the first captured image and supplies a binarized skin image constituted of the extracted skin area and area excluding the skin area to the skin extraction section 43 and the shape extraction section 46, but the present invention is not limited thereto.

In other words, for example, the binarization section 42 may extract a skin area of the user from the first captured image and supply a binarized skin image including at least the extracted skin area to the skin extraction section 43 and the shape extraction section 46.

In this case, the skin extraction section 43 extracts from the first captured image captured by the camera 22 an area corresponding to the skin area included in the binarized skin image supplied from the binarization section 42. Further, the shape extraction section 46 extracts a shape area from the skin area included in the binarized skin image supplied from the binarization section 42.

In this embodiment, the mask image generation section 45 detects a mask area and a non-mask area from the first captured image, for example, and generates a mask image constituted of the detected mask area and non-mask area, but the present invention is not limited thereto.

In other words, for example, the mask image generation section 45 may detect only the mask area as an extraction area for extracting a shape area from the binarized skin image and generate a mask image including at least the detected mask area. In this case, out of the skin area within the binarized skin image supplied from the binarization section 42, an area corresponding to the mask area within the mask image is extracted as a shape area in the shape extraction section 46.

Further, for example, the mask image generation section 45 may detect only the non-mask area as an extraction area and generate a mask image including at least the detected non-mask area. In this case, out of the skin area within the binarized skin image supplied from the binarization section 42, an area corresponding to the area excluding the non-mask area within the mask image is extracted as a shape area in the shape extraction section 46.

[Performance of Camera 22, LEDs 23a, and LEDs 23b]

Subsequently, with reference to FIGS. 13 and 14, the performance of the camera 22 and the light-emitting apparatus 23 constituting the information processing system 1 when the applicant of the present invention actually carried out the shape extraction processing and the FFT threshold value determination processing will be described.

The applicant of the present invention used a video camera manufactured by Sony Corporation as the camera 22. The camera 22 has a model number XC-EI50 and includes a ½ IT-type CCD as an image pickup device.

Further, the camera 22 has effective pixels of 768×494, and adopts a C mount as a lens mount and a scanning method of interlacing 525 lines as a scanning method.

Further, the sensitivity is F11 (400 lx) and a lowest depth of field is 0.1 lx. Further, an S/N (signal to noise) ratio of a captured image captured by the camera 22 is 60 dB.

Moreover, in the camera 22, a shutter speed by a shutter button (normal shutter) provided to the camera 22 in advance is ¹⁄₁₀₀ to ¹⁄₁₀,₀₀₀ sec, and a shutter speed by a release switch (external trigger shutter) externally connected to the camera 22 is ¼ to ¹⁄₁₀,₀₀₀ sec.

Further, the camera 22 has an outer dimension of 29 (width)×29 (height)×32 (depth) mm and a weight of about 50 g. Furthermore, the camera 22 has a vibration resistance of 70 G.

Moreover, the camera 22 has a sensitivity within a range from a visible region of 400 nm to a near-infrared region of 1,000 nm.

Figure 13:
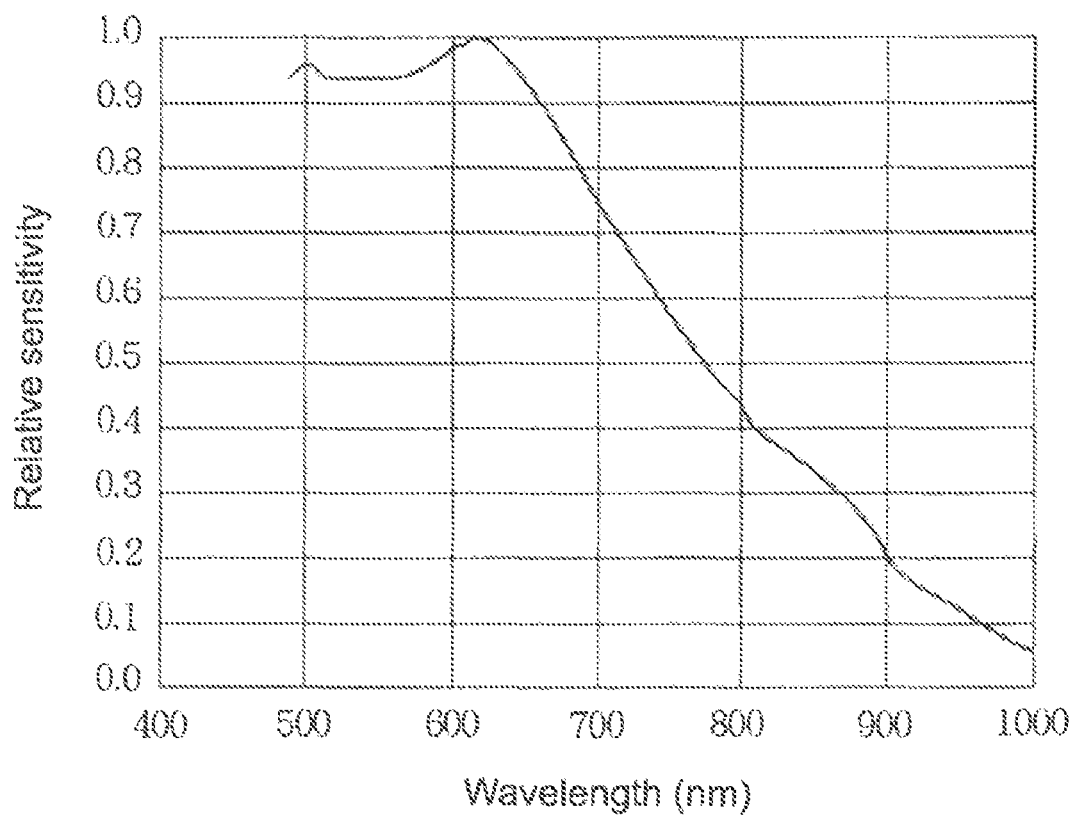
FIG. 13 is a diagram showing relative sensitivity characteristics of a camera.

FIG. 13 shows an example of relative sensitivity characteristics of the camera 22.

It should be noted that in FIG. 13, the horizontal axis indicates a wavelength that is incident to a lens of the camera 22 and the vertical axis indicates a relative sensitivity corresponding to the wavelength.

Figure 14:
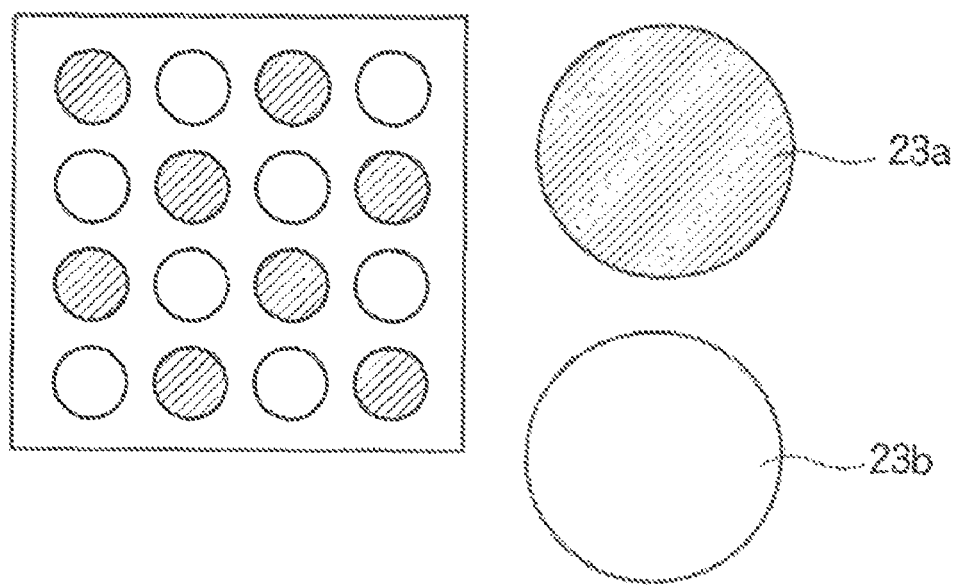
FIG. 14 is a diagram showing an arrangement method for LEDs.

Further, the applicant of the present invention used, as the light-emitting apparatus 23, eight LEDs 23a and eight LEDs 23b that were alternately arranged in a grid as shown in FIG. 14.

As the LEDs 23a actually used by the applicant of the present invention, LEDs that emit light having a wavelength of 870 nm were used, and as the LEDs 23b, LEDs that emit light having a wavelength of 950 nm were used.

In addition, LEDs having a DC forward current (absolute maximum rating) of 100 mA and a forward voltage of 1.6 V were used as the LEDs 23a and LEDs 23b.

The applicant of the present invention actually carried out the shape extraction processing and the FFT threshold value determination processing while using the camera 22 having the performance described above and the LEDs 23a and LEDs 23b arranged as shown in FIG. 14, and accordingly could find the evident operational effect described above.

In this embodiment, the mask image generation section 45 generates a mask image from the first captured image supplied from the camera 22 based on the mask threshold value supplied from the threshold value determination section 44, but the method of generating a mask image is not limited to the above.

In other words, for example, the mask image generation section 45 can perform stereo processing of generating a distance image expressing a distance from a camera to a user based on captured images captured by a plurality of cameras that capture images in different directions and adopt the resultant distance image as a mask image.

In this case, the shape extraction section 46 extracts a portion in which an area expressing a distance from the camera to the hand within the distance image supplied from the mask image generation section 45 overlaps the face area 101 and hand area 102 within the binarized skin image supplied from the binarization section 42, as a shape area 141 representing the shape of the hand of the user.

Further, as the method of generating the distance image as a mask image in addition to the stereo processing, it is possible to generate a distance image of the user while using a laser range finder or the like that calculates a distance to the user based on a time during which infrared rays are irradiated to the user and returned by being reflected on the user.

Further, in this embodiment, the first wavelength emitted from the LEDs 23a is set to 870 nm and the second wavelength emitted from the LEDs 23b is set to 950 nm, but the combination of the wavelengths is not limited thereto.

Specifically, any combination of wavelengths may be set as long as the combination leads to a sufficiently larger difference absolute value between a reflectance in the first wavelength and a reflectance in the second wavelength than an difference absolute value between reflectances obtained for an object other than the skin of the user. Specifically, as is apparent from FIG. 3, for example, a combination of 800 nm and 950 nm, that of 870 nm and 1,000 nm, and that of 800 nm and 1,000 nm may be possible in addition to the combination of 870 nm and 950 nm.

It should be noted that in a case where visible light is used as the light emitted from the LEDs 23a, a filter that passes only the visible light emitted from the LEDs 23a and causes the visible light to enter the lens of the camera 22 is used instead of the visible light cut filter 22a. The same holds true for the LEDs 23b.

Further, in this embodiment, the LEDs 23a and LEDs 23b emit light individually in the shape extraction processing. However, it is possible to acquire a first captured image and a second captured image by causing the LEDs 23a and LEDs 23b to emit light simultaneously.

Specifically, for example, two cameras having the same function as the camera 22 are provided close to each other in place of the camera 22. A filter to pass only the light having the first wavelength is provided in front of one camera out of the two cameras, and a filter to pass only the light having the second wavelength is provided in front of the other camera.

In this case, even when the LEDs 23a and LEDs 23b emit light simultaneously, only the light having the first wavelength enters the one camera, with the result that it is possible to obtain a first captured image in the one camera. Further, since only the light having the second wavelength enters the other camera, it is possible to obtain a second captured image in the other camera.

In this embodiment, the number of LEDs 23a and the number of LEDs 23b are each set to two, but the number of them is not limited to the above.

In addition, in this embodiment, the hand (shape thereof) as an object representing a body part of the user is changed to cause the information processing apparatus 21 to execute the predetermined processing, but it is possible to adopt a foot of the user or the like as an object, in addition to the hand.

Incidentally, a series of processing described above can be executed by dedicated hardware or software. In a case where the series of processing is executed by software, programs constituting the software are installed from a recording medium in a so-called built-in computer or a general-purpose personal computer that can execute various functions by installing various programs.

[Structure Example of Computer]

Figure 15:
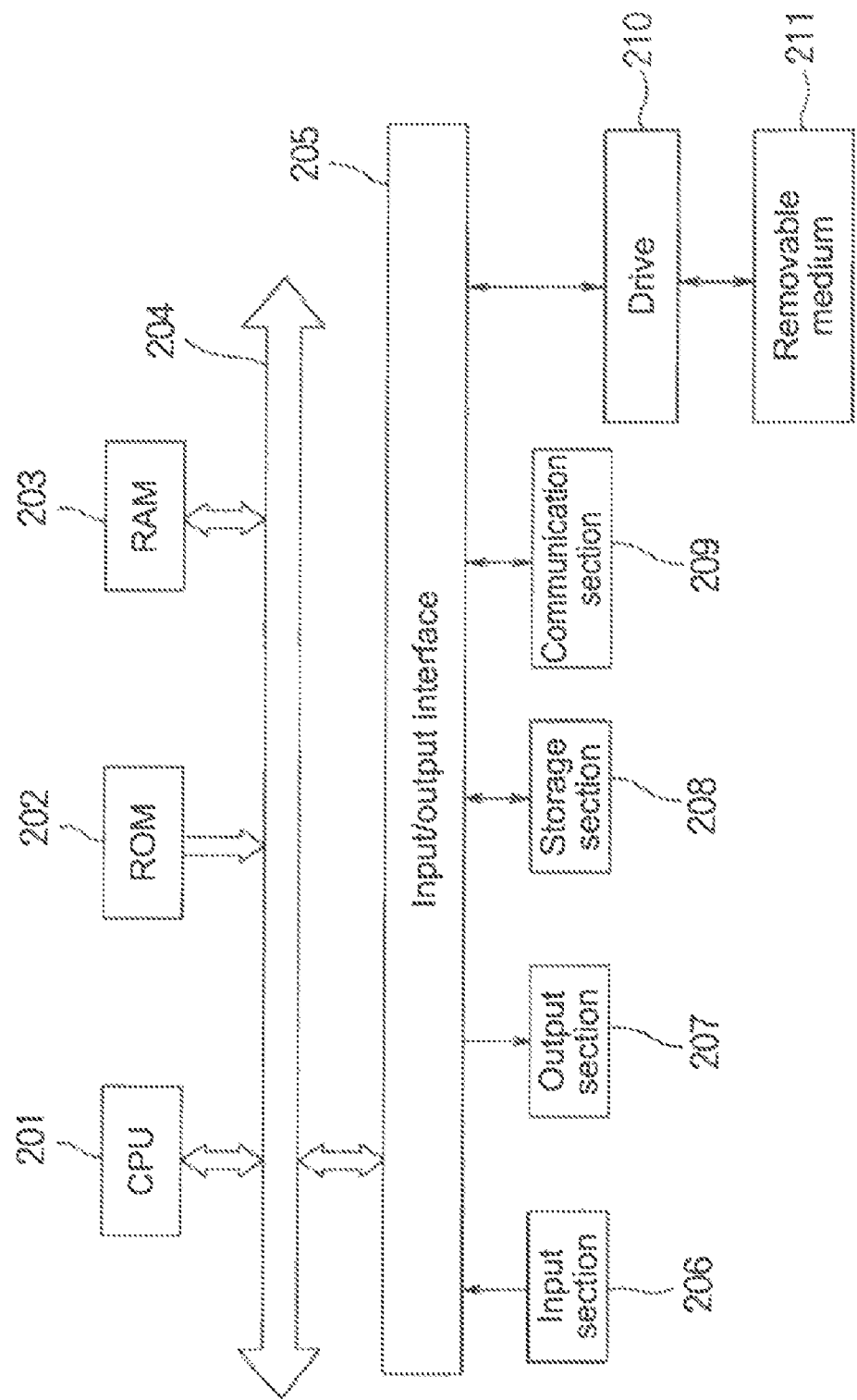
FIG. 15 is a block diagram showing a structure example of a computer.

Next, FIG. 15 shows a structure example of a personal computer that executes the series of processing described above by programs. For example, the sections, or each of the sections, of the information processing apparatus 21 illustrated in FIG. 2 may be implemented by at least one processor, such as the Central Processing Unit 201 illustrated in FIG. 15. In one embodiment, the binarization section 42, the skin extraction section 43, the threshold value determination section 44, the mask image generation section 45, and the shape extraction section 46 (or each of those sections) may be implemented by a single processor or a plurality of different processors.

A CPU (Central Processing Unit) 201 executes various types of processing in accordance with programs stored in a ROM (Read Only Memory) 202 or a storage section 208. A RAM (Random Access Memory) 203 stores programs to be executed by the CPU 201, data, and the like as appropriate. Those CPU 201, ROM 202, and RAM 203 are connected to each other via a bus 204.

Further, the CPU 201 is connected with an input/output interface 205 via the bus 204. The input/output interface 205 is connected with an input section 206 such as a keyboard, a mouse, and a microphone and an output section 207 such as a display and a speaker. The CPU 201 executes various types of processing in accordance with commands that are input from the input section 206. Then, the CPU 201 outputs results of the processing to the output section 207.

The storage section 208 connected to the input/output interface 205 is constituted of, for example, a hard disk and stores programs to be executed by the CPU 201 and various types of data. The communication section 209 communicates with an external apparatus via a network such as the Internet and a local area network.

Further, a program may be acquired via the communication section 209 and stored in the storage section 208.

A drive 210 connected to the input/output interface 205 drives a removable medium 211 such as a magnetic disc, an optical disc, a magneto-optical disc, and a semiconductor memory when the removable medium 211 is mounted thereto, and acquires programs and data stored in the removable medium 211. The acquired programs and data are transferred to the storage section 208 as necessary and stored therein.

A recording medium that records (stores) programs installed in and executed by the computer is constituted of, as shown in FIG. 15, the removable medium 211 that is a package medium such as a magnetic disc (including a flexible disc), an optical disc (including a CD-ROM (Compact Disc-Read Only Memory) and a DVD (Digital Versatile Disc)), a magneto-optical disc (including an MD (Mini-Disc)), and a semiconductor memory, the ROM 202 in which programs are temporarily or permanently stored, or a hard disk constituting the storage section 208. The programs are recorded on the recording medium via the communication section 209 as an interface such as a router and a modem as appropriate while using a wireless or wired communication medium such as a local area network, the Internet, and a digital broadcast.

It should be noted that herein the steps describing the above series of processing include, in addition to processing that are performed in time series in the described order, processing that are executed in parallel or individually though not processed chronologically.

Moreover, the system herein represents the overall apparatuses constituted of a plurality of apparatuses.

It should be noted that the embodiment of the present invention is not limited to this embodiment described above and can variously modified without departing from the gist of the present invention.

REFERENCE SIGNS LIST 1 information processing system
21 information processing apparatus
22 camera
23 light-emitting apparatus
41 controller
42 binarization section
43 skin extraction section
44 threshold value determination section
45 mask image generation section
46 shape extraction section

The invention claimed is:

1. An information processing apparatus for extracting a shape of an object representing a predetermined body portion of a user body from a captured image acquired by capturing the user, comprising:
   irradiating means for irradiating light having a first wavelength and light having a second wavelength different from the first wavelength onto the user;
   acquiring means for acquiring a first image acquired by receiving reflected light of light having the first wavelength emitted irradiated onto the user, and a second image acquired by receiving reflected light of light having the second wavelength emitted irradiated onto the user;
   skin area extracting means for extracting a skin area representing skin of the user based on the first image and the second image; and
   shape area extracting means for extracting a shape area representing a shape of the object on the skin area, wherein,
   the shape area extracting means extracts the shape area based on a luminance value distribution of pixels constituting an area corresponding to the skin area on a displayed image displaying the object, and a body part of the user corresponding to an area excluding the shape area on the skin area.

2. The information processing apparatus according to claim 1, wherein,
   the shape area extracting means detects an extraction area for extracting the shape area from the skin area based on a luminance value distribution of pixels constituting an area corresponding to the skin area on the displayed image, and extracts the shape area on the skin area based on the detected extraction area.

3. The information processing apparatus according to claim 2, wherein,
   the shape area extracting means determines a mask threshold for extracting the extraction area based on the luminance value distribution of the pixels constituting the area corresponding to the skin area on the displayed image, and detects the extraction area by using the determined mask threshold.

4. The information processing apparatus according to claim 3, wherein,
   the shape area extracting means determines a lower limit threshold value representing a lower limit and an upper limit threshold value representing an upper limit, as the mask threshold, and detects the extraction area by using the lower limit threshold value and the upper limit threshold value.

5. The information processing apparatus according to claim 1, wherein,
   the shape area extracting means extracts the skin area based on differences between a luminance value of corresponding pixels of the first image and the second image.

6. The information processing apparatus according to claim 1, further comprising:
   light cutting means for cutting off light having a wavelength excluding the first wavelength and the second wavelength, and passes only the light having the first wavelength and the second wavelength; and
   generating means for generating the first image by receiving light of the light having the first wavelength passed the light cutting means, and the second image by receiving light of the light having the second wavelength passed the light cutting means, wherein,
   the acquiring means acquires the first image and the second image generated by the generating means.

7. The information processing apparatus according to claim 1, wherein,
   the irradiating means irradiates the light having the first wavelength and the light having the second wavelength where a difference absolute value between a reflectance of reflected light acquired by irradiating the light having the first wavelength onto the skin of the user and a reflectance of reflected light acquired by irradiating the light having the second wavelength onto the skin of the user are equal to or larger than a predetermined threshold value.

8. The information processing apparatus according to claim 1, wherein,
   the irradiating means irradiates the light having the first wavelength of equal or more than 940 nm, and irradiates the light having the second wavelength of less than 940 nm.

9. An information processing method by an information processing apparatus for extracting a shape of an object representing a predetermined body portion of a user body from a captured image acquired by capturing the user, the information processing apparatus including,
   irradiating means,
   acquiring means,
   skin area extracting means, and
   shape area extracting means,
   and the method comprising:
   irradiating, by the irradiating means, light having a first wavelength and light having a second wavelength different from the first wavelength onto the user,
   acquiring, by the acquiring means, a first image acquired by receiving reflected light of light having the first wavelength emitted irradiated onto the user, and a second image acquired by receiving reflected light of light having the second wavelength emitted irradiated onto the user,
   extracting, by the skin area extracting means, a skin area representing skin of the user based on the first image and the second image, and
   extracting, the shape area extracting means, a shape area representing a shape of the object on the skin area, wherein,
   the shape area extracting means extracts the shape area based on a luminance value distribution of pixels constituting an area corresponding to the skin area on a displayed image displaying the object, and a body part of the user corresponding to an area excluding the shape area on the skin area.

10. A non-transitory computer-readable storage medium storing a program to cause a computer controlling an information processing apparatus for extracting a shape of an object representing a predetermined body portion of a user body from a captured image acquired by capturing the user, and including an irradiating means for irradiating light having a first wavelength and light having a second wavelength different from the first wavelength onto the user, to perform a method comprising:
   acquiring a first image acquired by receiving reflected light of a light having the first wavelength emitted irradiated onto the user, and a second image acquired by receiving reflected light of a light having the second wavelength emitted irradiated onto the user;
   extracting a skin area representing skin of the user based on the first image and the second image; and extracting a shape area representing a shape of the object on the skin area, wherein, the shape area is extracted based on a luminance value distribution of pixels constituting an area corresponding to the skin area on a displayed image displaying the object, and a body part of the user corresponding to an area excluding the shape area on the skin area.

* * * * *